Oct. 4, 1955  R. E. CLOUGH  2,719,621
FLUID OPERATED FRICTION CLUTCHES
Filed May 17, 1950  12 Sheets-Sheet 1

FIG. 1.

Inventor
ROBERT EDWARD CLOUGH
By Linton and Linton
Attorneys

FIG.2

Oct. 4, 1955   R. E. CLOUGH   2,719,621
FLUID OPERATED FRICTION CLUTCHES
Filed May 17, 1950   12 Sheets—Sheet 3

FIG. 2a

Inventor
ROBERT EDWARD CLOUGH
By Linton and Linton
Attorneys

FIG.6.

Oct. 4, 1955 R. E. CLOUGH 2,719,621
FLUID OPERATED FRICTION CLUTCHES
Filed May 17, 1950 12 Sheets-Sheet 7

FIG. 7.

Inventor
ROBERT EDWARD CLOUGH
Linton By and Linton
Attorneys

United States Patent Office 2,719,621
Patented Oct. 4, 1955

2,719,621

FLUID OPERATED FRICTION CLUTCHES

Robert Edward Clough, Pettswood, Orpington, England, assignor to Automatic Transmission Limited, Suva, Fiji, a limited company Application May 17, 1950, Serial No. 162,440

8 Claims. (Cl. 192—87)

This invention relates to improvements in the construction and operation of friction clutches which are adapted to engage and disengage automatically at predetermined velocities, as may be required, and also adapted to be disengaged by automatic or manual release of the engaging pressure at any velocity of rotation as desired. While friction clutches, according to the present invention, are applicable to various types of rotary transmission, they have particular utility in automatic transmission gearing units for mechanically propelled vehicles.

Known types of automatically operated friction clutches are generally actuated by segmental weights adapted for displacement by centrifugal force into frictional engagement with the driven members of said clutches, and engagement and disengagement can be regulated by adjustment of the weights and of the springs provided for restraining their engagement or disengagement to operate at desired velocities, but provision for readily disengaging such clutches when revolving at high velocities is impracticable.

According to the present invention, I provide a friction clutch for the transmission of rotary motion from an engine, or other driving member, to a driven member connected, for example, to a shaft or sleeve for transmitting motion for the propulsion of a vehicle, or other purpose, either directly or through the medium of gearing, with the driven member being started from rest or accelerated from a lower velocity, said clutch having self-contained hydraulic means adapted to be energised by relative velocity between adjacent driving and driven portions of the clutch, or, alternatively, by the relative movement between a rotating portion of the clutch and a stationary member during the periods in which the clutch is engaging or slipping.

The automatic engagement of said clutch is effected by hydraulic pressure on a ram or rams, such pressure being furnished by a hydraulic pump or pumps which draw hydraulic fluid from one or more reservoirs situated in the clutch, said pumps being actuated by relative motion between the driving and driven portions of the clutch, and in one of which portions the pumps are situated.

The engaging period of the clutch is suitably prolonged in order to obtain smooth engagement, by ensuring that the capacity of the pumps is small in relation to that of the ram chamber, and when the hydraulic pressure is such as to provide adequate frictional engagement of the clutch there is no relative movement between the driving and driven portions thereof, and actuation of the pumps will cease.

The disengagement of said clutch is effected by releasing the pressure from the chamber of the hydraulic ram by release valves of which two types may be provided, one type being automatic and actuated by centrifugal force against spring influence, and the other type being manually operable. By the use of the automatic release valves, engagement of the clutch can be delayed until its velocity reaches a predetermined magnitude, and by a suitably adjusted return spring in conjunction with a pressure balancing piston valve, the velocity at which disengagement occurs can be of a lower magnitude than that of the engagement. By this means the clutch can be arranged to engage when the engine is accelerated to a suitable velocity, but not to disengage too readily with the natural fall in velocity as the engine takes the load. The manually operable valves can be used to disengage the clutch at any velocity, and one of their functions is to cause disengagement of the clutch when it is accelerating, and by this means to permit a vehicle when descending a steep gradient to change to "low gear" in order to assist braking of the vehicle.

On the hydraulic pressure being released from said ram chambers, in order to disengage the clutch, the hydraulic fluid is returned to the reservoirs by appropriate passages, and there is formed a closed hydraulic circuit within the clutch. The construction of the clutch is such that, as long as there is relative motion between the driving and driven portions thereon, the hydraulic pumps will operate until sufficient pressure is built up in the ram chambers to cause engagement of the clutch, and as the relative motion ceases the pumps will cease to operate and remain inoperative until slipping of the clutch occcurs to cause the pumps to restart.

Each hydraulic pump is constructed as a compact unit, consisting of a plunger with a return spring disposed in the pump chamber, a suction valve with connecting passage to admit hydraulic fluid during the suction stroke from a reservoir disposed within the clutch, and a delivery valve and passage to discharge the fluid under pressure to the ram chamber of the clutch by displacement of the plunger so as to retain the pressure in the ram chamber. The pump is characterised in that the component members are joined by screwed sleeves to facilitate its insertion and withdrawal as a unit from an aperture provided in the clutch forming the external wall of the pump.

Friction clutches, according to the invention, are especially adaptable, in combination with like or other types of automatic friction clutches, or with manually operated clutches of any type, to operate change-speed gear units wherein engagement of the clutches successively, alternately, alternatively, or collectively, (when associated with respective gears of different ratios) can be regulated to operate the most suitable ratio of gearing so as to employ the range of torque at which the engine is most efficient.

In carrying this adaptation into practical effect, the clutches are respectively connected to a central shaft, and to torque sleeves disposed therearound, each of which, in turn, is attached to its respective ratio of gearing, the ratios being selected automatically with the corresponding engagement of the clutches, either independently or in combination. In gear units employing countershafts, and where the gearing is constantly in mesh, overrunning devices, such as roller clutches, are provided to ensure that the assembly of gears does not lock due to pairs of gears of different ratios being interconnected. Where gearing of the epicyclic type is employed this itself functions in the manner of an overrunning device and is thus convenient for the adaptation of clutch assemblies according to the invention. In this respect clutches embodying additional and independent hydraulic rams to press one or more individual clutches into engagement to suit alternative sequences of operation are provided.

In the adaptation of my clutches, for example, to vehicular transmissions, circumstances may arise in which it is expedient to accentuate the pressure in an engaged clutch, and provision may be made, according to my invention, for one or more pumps in an assembly of clutches to be operable independently by relative motion between the clutch and an external part of the gear unit or its housing. A convenient method of accentuating the pressure of an engaged clutch is to provide means whereby said pumps are also actuable by auxiliary gearing from the countershaft which rotates an independent cam; and an alternative method of providing relative motion is by means of a brake attached to the gear housing and adapted to retard an independent cam which operates the pumps.

When it is convenient to have a hydraulic operated friction clutch, as hereinbefore described, having automatic centrifugal release valves which cause the clutch to be engaged and disengaged at the same velocity, an alternative construction of valve is utilised, in which the before mentioned pressure balancing piston valve is itself counterbalanced by an additional piston.

Safeguards may be incorporated in the clutches, when considered necessary, to avoid excessive pressure building up in the ram chambers thereof, by the provision of a spring-loaded relief valve; and, to eliminate the risk of inadequate hydraulic fluid supply in the reservoirs, an auxiliary reservoir may be formed in the body of the clutch adjacent its axis with passages leading the fluid to the main reservoir by centrifugal force via a float valve controlling means or its equivalent.

I will further describe my invention with the aid of the accompanying drawings which illustrate by way of examples only and not of limitation several modes of embodying same.

In said drawings, in which like figures of reference denote like or equivalent parts wherever they occur:

Figs. 2 and 2a viewed together provide a sectional elevation of a gear unit with which the assembly of clutches shown in Fig. 1 is adapted to form a variable ratio vehicular transmission.

Figure 1:
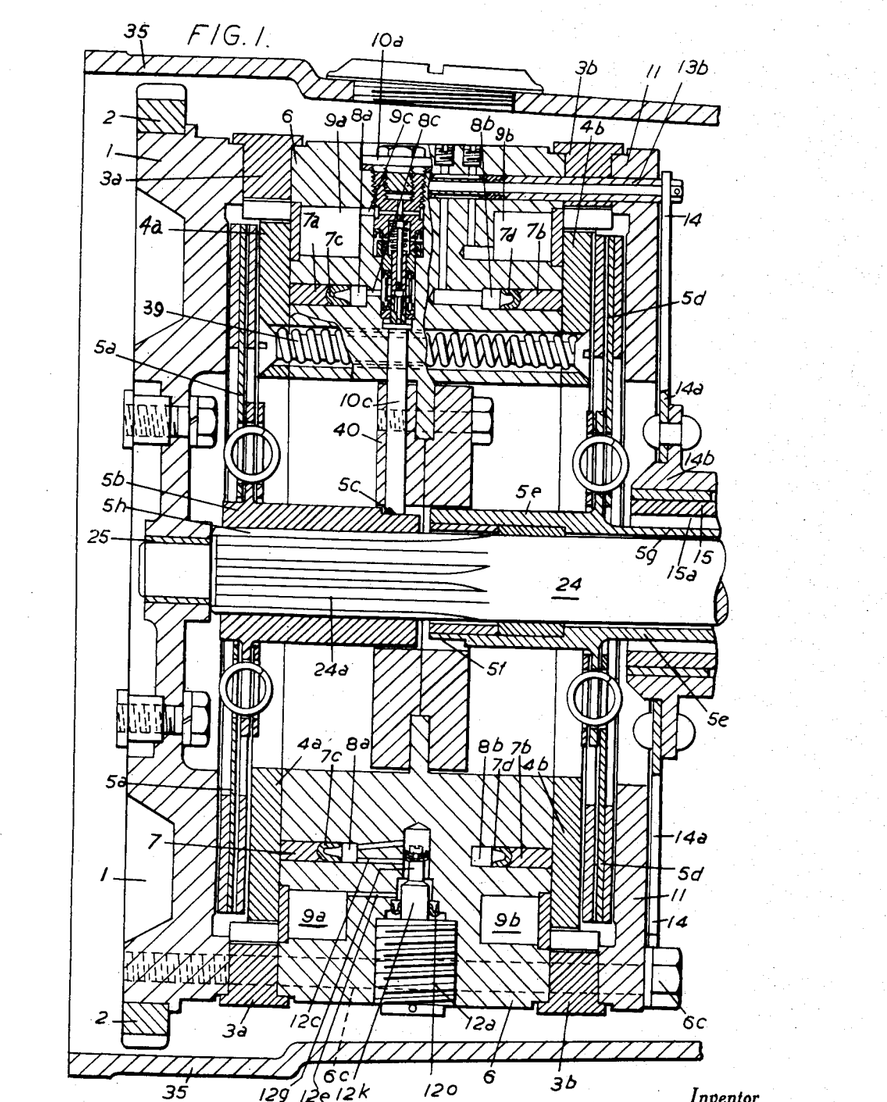
Fig. 1 is a sectional elevation of an assembly of two hydraulically operated friction clutches.
Figure 2:
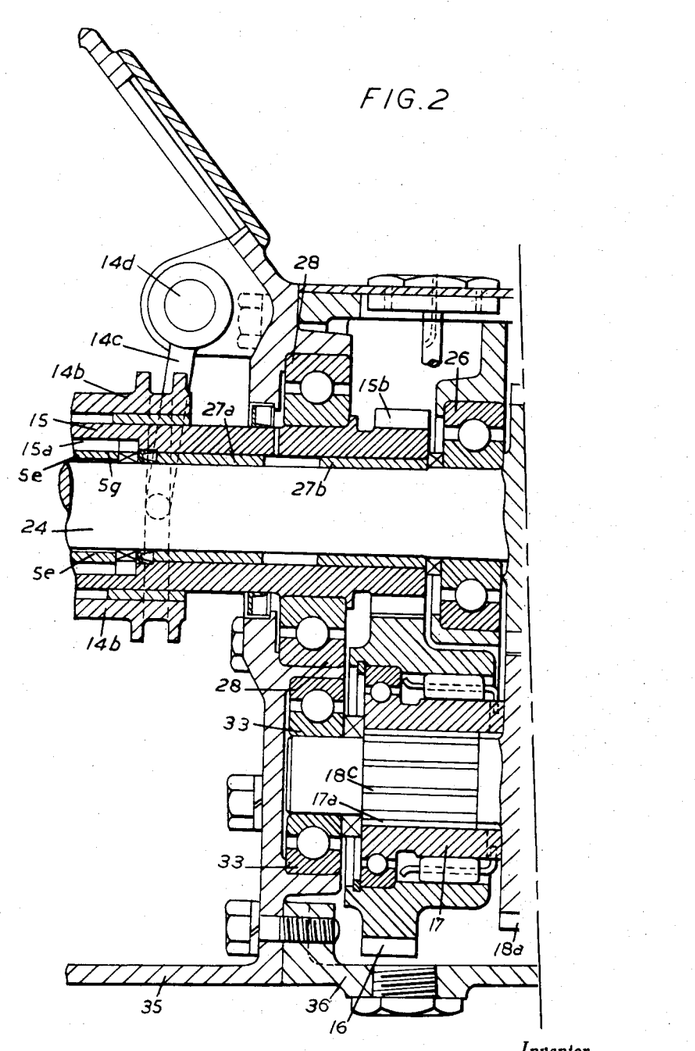
Fig. 2 is a left hand portion of the gear unit and Fig. 2a is the right hand portion thereof.
Figure 2A:
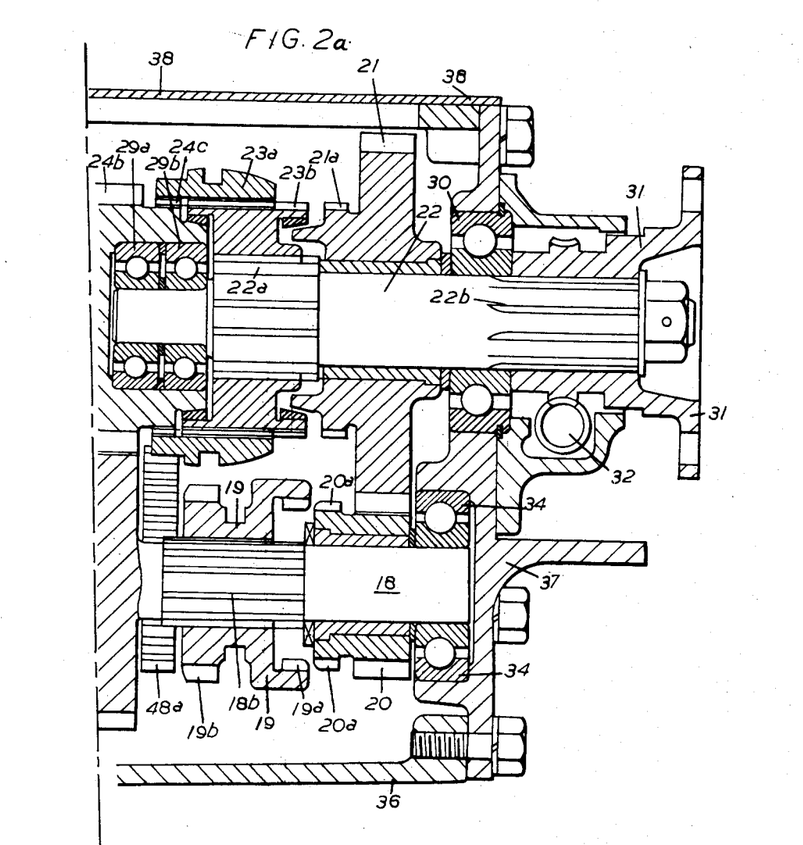
Figure 3:
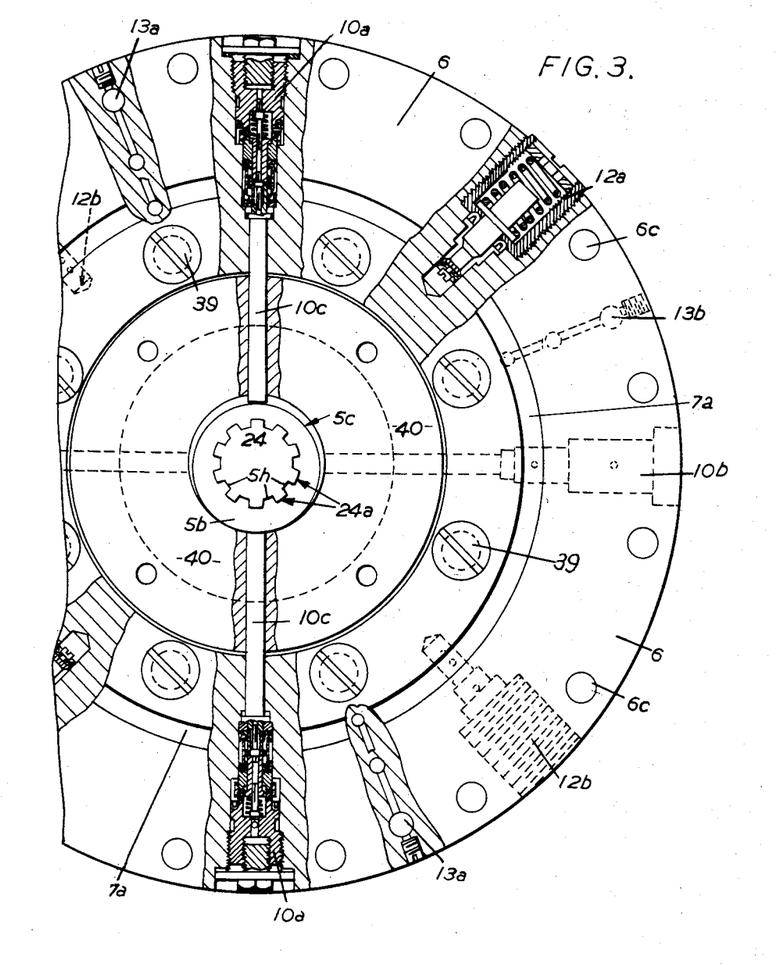
Fig. 3 is an end elevation, partly in section, with portions removed, of the hydraulically operated clutch assembly shown in Fig. 1.

Referring first to Figs. 1, 2 and 3, of the drawings, 1 indicates the engine flywheel of a vehicle, 2 is a toothed rim rigidly attached to the flywheel for engagement by self-starting apparatus, and $3^a$, $3^b$ are housings with internal splines for engaging corresponding splines on foremost and rear pressure plates $4^a$, $4^b$, respectively. $5^a$ and $5^d$ are, respectively, foremost and rear friction clutch plates of known spring drive construction and constituting the driven members. $5^b$ is the foremost clutch plate hub provided with internal driving splines $5^h$, and $5^c$ is a cam or eccentric integral with the hub for actuating the foremost hydraulic pumps. $5^e$ is the rear clutch plate hub provided with external driving splines $5^g$, and $5^f$ is a cam or eccentric, integral with said hub, for actuating the rear hydraulic pumps. 6 is the clutch motive housing for the hydraulic mechanism, $7^a$, $7^b$ are, respectively, foremost and rear hydraulic rams of annular form, and $7^c$, $7^d$ are hydraulic packings for the respective rams. $8^a$, $8^b$ are, respectively, foremost and rear annular ram chambers which are connected with their respective pump deliveries by passages one of which is denoted at $8^c$. $9^a$ and $9^b$ are, respectively, foremost and rear annular reservoirs for the hydraulic fluid medium, and $9^c$ and a similar passage, not shown, are respectively connecting passages between said reservoirs and pump sections. $10^a$, $10^b$ are, respectively, hydraulic pump units for foremost and rear clutches, and 11 is a reaction plate for the rear clutch.

The driving portions of the foremost and rear clutches consisting of engine flywheel 1, foremost pressure plate housing $3^a$, clutch motive housing 6, rear pressure plate housing $3^b$, and reaction plate 11, are connected to form a composite unit by coupling bolts $6^c$ disposed around the periphery of said unit. $12^a$, $12^b$ are respectively, centrifugally operated automatic hydraulic release valves for foremost and rear clutches. $12^c$, $12^e$ are connecting passages to foremost ram chamber $8^a$ and reservoir $9^a$, respectively, from valve $12^a$. Similar passages (not shown) connect rear ram chamber $8^b$ and reservoir $9^b$, respectively, with valves $12^b$. $13^a$, $13^b$ are manually operable release valves of piston type (in this example) for foremost and rear clutches, respectively. 14 generally denotes the combined operating means for said release valves $13^a$, $13^b$; $14^a$ being an operating plate of spider form with its extremities attached to the respective release valves so as to give them sliding motion parallel to their axis of rotation. $14^b$ is an axially slidable hub whereto operating plate $14^a$ is fixedly attached. $14^c$ is a pivotally disposed spur for axially displacing hub $14^b$ while the latter is rotating, and $14^d$ is a pivotal pin to which spur $14^c$ is fixedly attached, in order that when pivotal pin $14^d$ is partially rotated by an external lever, or the like, (not shown) the whole is displaced proportionally. 15 is a torque sleeve having internal splines $15^a$, and a gear-wheel $15^b$ integral with said torque sleeve constitutes the driving gear wheel, said splines $15^a$ being engaged with the splines $5^g$ of hub $5^e$. 16 is the driven gear wheel of the first ratio gearing. 17 is an overrunning roller clutch, of known construction and characteristics, provided with internal splines $17^a$ to engage with corresponding splines $18^c$ on a countershaft 18 and formed integrally with the latter is a driving gear wheel $18^a$ of a second ratio of gearing. Slidably disposed on a splined middle portion $18^b$ of countershaft 18 is a member 19 having formed thereon a dog clutch $19^a$ for manually effecting engagement of the third ratio of gearing and a driving gear wheel $19^b$ for the reverse gearing.

The forward or reverse movement of the vehicle is accomplished by axial displacement of member 19 to cause engagement of dog clutch $19^a$ or driving gear wheel $19^b$ with their respective gear trains, the middle position of member 19, (as illustrated in Fig. 2) being neutral. The driving gear wheel 20 of the third ratio gearing can freely revolve on countershaft 18, until it is engaged by means of splines $20^c$ with dog clutch $19^a$, when it drives a slow speed gear wheel 21, and the motion is then communicated to a main transmission shaft 22 by a dog clutch $23^a$ wherewith is combined a friction synchronising device $23^b$ of known suitable construction, which latter is, in turn, slidably disposed on splines $22^a$ of transmission shaft 22. Manual displacement of dog clutch 23ª axially towards the rear makes the low stage gearing operative, while its displacement forward renders the top stage gearing operative. For the top stage gearing ratios dog clutch 23ª is engaged, by means of splines 24ᶜ, with a gear wheel 24ᵇ which is integral with a shaft 24; and shaft 24, by means of splines 24ª at its forward end, is in engagement with friction clutch plate hub 5ᵇ. Shaft 24 is supported at its foremost end in a plain bushing 25 of flywheel 1, and at its rear end in a ball bearing 26, and also by a ball bearing 28 which, in addition, takes the end thrust from gear wheel 15ᵇ. Transmission shaft 22 is carried in ball bearings 29ª, 29ᵇ at the foremost end, and ball bearing 30 adjacent to its rear end. The tractive effort is transmitted through splines 22ᵇ to a torque coupling 31 which also drives a lubricating pump 32, both the latter being of known construction. Countershaft 18 is carried in ball bearings 33, 34. The clutch assembly is enclosed in a casing 35, and the gearing is enclosed in a casing 36 having an end enclosure 37 and a top cover 38. To facilitate disengagement of the clutch pressure plates 4ª, 4ᵇ, helical springs 39 are provided, and pumps 10ª, 10ᵇ, which in this example are operated directly by cams 5ᵉ, 5ᶠ, are provided with guides 40.

To operate the transmission gear unit according to the present example when fitted to a vehicle, commencing with the engine flywheel rotating slowly and the pumps 10ª, 10ᵇ respectively circulating the hydraulic fluid from the reservoirs 9ª, 9ᵇ, through passage 9ᶜ and a similar passage (not shown) to the pump suctions, from the pump deliveries through passage 8ᶜ and a similar passage (not shown) to the ram chambers 8ª and 8ᵇ; thence from the ram chambers 8ª, 8ᵇ through passage 12ᶜ and a similar passage (not shown) via said release valves 12ª, 12ᵇ and through passage 12ᵉ and a similar passage (not shown) back to the reservoirs 9ª, 9ᵇ, dog clutch 19ª is firstly manually engaged with splines 20ª, and dog clutch 23ª manually engaged with splines 21ª. This interconnects the rear or primary clutch plate 5ᵈ through hub 5ᵉ to transmission shaft 22 by means of splines 5ᵍ of hub 5ᵉ and splines 15ª of sleeve 15, through the gears 15ᵇ, 16, 20 and 21, and gives double reduction of the greatest overall ratio of the example, and known as "low gear".

The vehicle is set in motion by accelerating the engine until the centrifugal release valves 12ᵇ for the rear clutch automatically closes the hydraulic circuit, when the pumps 10ᵇ build up the hydraulic pressure within ram chamber 8ᵇ, causing ram 7ᵇ to move out and press pressure plate 4ᵇ and clutch plate 5ᵈ against reaction plate 11 until clutch plate 5ᵈ is driven without slipping, when the pumps 10ᵇ will cease to operate. As the vehicle commences to move, the engine speed will naturally fall somewhat below that at which centrifugal release valves 12ᵇ automatically closed the hydraulic circuit, and at which speed they would otherwise open to release the pressure, but, by means of a device hereinafter described, the valves remain closed until a lower predetermined disengaging speed is reached. As the momentum of the vehicle increases, the engine can be accelerated until the centrifugal release valves 12ª automatically close the hydraulic circuit of the foremost clutch, when the hydraulic pumps 10ª build up the pressure in ram 7ª to move out and press pressure plate 4ª and clutch plate 5ª against the flywheel 1 until clutch plate 5ª is driven without slipping, when the pumps 10ª cease to operate. The drive is now in "second gear" and motion is communicated from shaft 24 to transmission shaft 22 through gearing in the following order, 24ᵇ, 18ª, 20 and 21. For convenience of description, the first and second gear ratios are referred to herein as "low stage," and third and top gear ratios as "top stage." During the time the drive is in "second gear" the first ratio gears 15ᵇ, 16 are rendered inoperative through the overrunning roller clutch 17 being driven faster by shaft 18 than through the first gear ratio. The next successive gear ratio, known as "third gear," is obtained by sliding both dog clutches to change to "top stage" ratios. Dog clutch 23ª is moved to connect gearing 23ᵇ to gearing 24ᶜ, and simultaneously dog clutch 19ª is disengaged from splines 20ª and moved to a neutral position, the hydraulic pressure on the foremost clutch being released automatically by reducing the engine speed, or manually if required. By this action the rearmost friction clutch plate 5ᵈ again takes the drive and the motion is communicated to shaft 22 through gearing in the following order, 15ᵇ, 16, 18ª, and 24ᵇ. The overall gear ratio, now being smaller than "second gear" permits the vehicle to continue at the same velocity with a lower engine speed, the centrifugal release valves 12ª release the foremost clutch pressure and the clutch positively disengages. The next successive ratio known as "top gear" or direct drive is obtained by accelerating the engine until the centrifugal release valve 12ª automatically closes the hydraulic circuit in the foremost clutch, when the hydraulic pumps 10ª again build up the hydraulic pressure in the ram chamber 8ª, causing ram 7ª, by means of pressure plate 4ª, to press clutch plate 5ª against flywheel 1 until clutch plate 5ª is driven without slipping, when the pumps 10ª cease to operate. The drive is now communicated directly through shaft 24 which is connected by dog clutch 23ª in its foremost position to transmission shaft 22 without the interposition of gearing. At this time, roller clutch 17 is rendering inoperative gears 15ᵇ and 16.

As the vehicle proceeds in "top gear" deceleration below a predetermined speed for which centrifugal release valves 12ª are set, due to hill climbing or like impedance, causes said valves to release the hydraulic pressure in the foremost clutch which disengages pressure plate 4ª assisted by "anti-drag" springs 39, and the drive is reduced to "third gear" automatically. When the temporary impedance is overcome and the engine is again accelerated the centrifugal release valves 12ª close, pressure in ram chamber 8ª is restored by the hydraulic pumps 10ª, and the foremost clutch re-engages the "top gear."

To obtain "reverse gear," starting with the engine running, the hydraulic clutches disengaged, and dog clutches 19ª, 23ª in their neutral positions, dog clutch 23ª is engaged with splines 21ª, and the gear wheel 19ᵇ is moved into engagement with a reverse gear wheel 48ª which is integral with a gear wheel not shown and disposed on a reverse layshaft in constant engagement with gear wheel 21. Acceleration of the engine will cause engagement of the rearmost hydraulic clutch, as hereinbefore described, and the drive is communicated by clutch plate 5ᵈ, sleeve 15, gear wheels 15ᵇ, 16, countershaft 18, gear wheel 19ᵇ and said reverse layshaft gear wheels, to gear wheel 21 and thence, by splines 21ª, and dog clutch 23ª, 23ᵇ which is splined on transmission shaft 22, to coupling 31.

Four manually operable pressure release valves are provided in the present example, two 13ª, 13ª for the foremost clutch, and two 13ᵇ, 13ᵇ for the rearmost clutch. Said valves are operable simultaneously by sleeve 14ᵇ and attachment plate 14ª when displaced by spur 14ᶜ, and are arranged to interconnect ram chambers 8ª or 8ᵇ with their respective reservoirs 9ª or 9ᵇ, according to the extent of displacement of sleeve 14ᵇ.

In Fig. 1, the manual release valve 13ᵇ is shown in its pressure releasing position with the rear clutch thus disengaged. The corresponding release valve 13ª for the foremost clutch is also simultaneously releasing the pressure from ram chamber 8ª, the sleeve 14ᵇ being in its foremost position as shown. Movement of sleeve 14ᵇ to a midway position renders operative the rear clutch, and, on moving sleeve 14ᵇ fully to the rear, release valves 13ª then render operative the foremost clutch, both clutches being now operable.

Figures 4, 5:
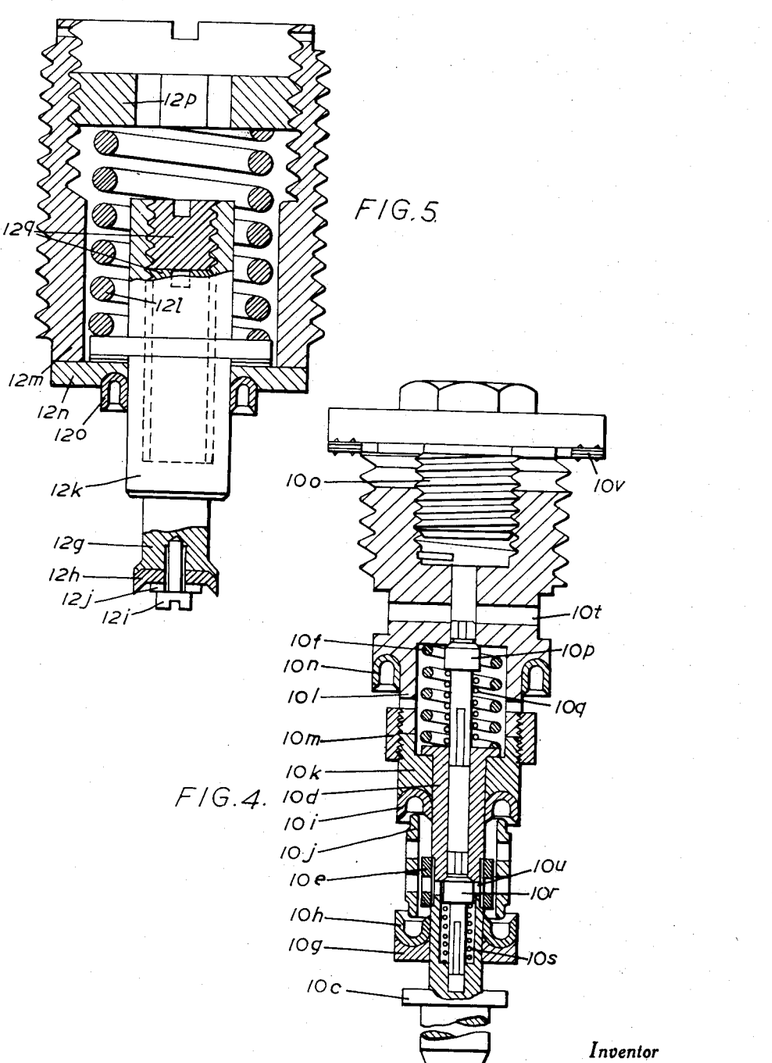
Fig. 4 is a sectional elevation, drawn to an enlarged scale as compared with the preceding views, of the hydraulic pump unit.
Fig. 5 is an enlarged sectional elevation of the automatic release valve.

Referring now to Fig. 4 showing details of the hydraulic pumps 10ª, 10ᵇ, as hereinbefore referred to, 10ᶜ denotes the tappet shank for a pump plunger 10ᵈ which is joined thereto by a threaded sleeve 10ᵉ. 10ᶠ is a compression spring for effecting the return stroke of plunger 10$^d$; 10$^g$ is a gland ring, and 10$^h$ is a hydraulic packing ring for the tappet shank 10$^c$; 10$^i$ is a hydraulic packing ring for pump plunger 10$^d$; 10$^j$ is a lantern type separator for hydraulic packing rings 10$^h$, 10$^i$; and 10$^k$ is a gland ring for pump plunger 10$^d$. 10$^l$ is the pump chamber which is provided on its upper portion with an external screw thread for positioning the pump in the clutch motive housing 6. 10$^m$ is a threaded sleeve for fixedly connecting pump chamber 10$^l$ to gland ring 10$^k$, and 10$^n$ is a hydraulic packing ring for sealing the hydraulic pressure chamber 10$^l$ within the pump reception aperture. 10$^o$ is a plug for the pump aperture in said clutch motive housing 6. 10$^p$ is the pump suction valve; 10$^q$ is a helical compression spring for retaining valve 10$^p$ in place; 10$^r$ is the pump delivery valve; and 10$^s$ is a compression spring for retaining valve 10$^r$ in place. 10$^t$ is a connecting passage to the pump suction valve 10$^p$ from the hydraulic fluid reservoir (9$^a$ or 9$^b$, as hereinbefore referred to), and 10$^u$ is a connecting passage from pump delivery valve 10$^r$ to the hydraulic ram chamber (8$^a$ or 8$^b$ as hereinbefore referred to). 10$^v$ is a gasket for sealing the plug 10$^o$ in the pump aperture of clutch motive housing 6.

The hydraulic pump, as illustrated, is a composite unit for insertion in clutch motive housing 6, the several parts of said pump being held together by the threaded sleeves 10$^e$, 10$^m$, thus facilitating ready insertion, and/or replacement.

In operation, the tappet shank 10$^c$, which is connected to pump plunger 10$^d$, is reciprocated by its actuating cam (5$^c$ or 5$^f$, as the case may be), and on the return stroke actuation is effected by the compression spring 10$^f$. Reciprocation of the pump plunger 10$^d$ causes the hydraulic fluid to flow during the outward stroke of said plunger from the reservoir (9$^a$ or 9$^b$) by means of connecting passage 10$^t$, past the suction valve 10$^p$ and into the hydraulic pressure chamber 10$^l$; and on the inward stroke of plunger 10$^d$, the hydraulic fluid is forced past delivery valve 10$^r$, through connecting passage 10$^u$, to a ram chamber (8$^a$ or 8$^b$) until sufficient pressure is built up in said ram chamber to engage the clutch. On attaining this state relative motion between the pump operating cam (5$^c$ or 5$^f$) and the clutch motive 6 containing the pump ceases, and the pump consequently becomes inoperative. Adjustment in the length of stroke of pump plunger 10$^d$ may be effected by varying the distance which pump chamber 10$^l$ is screwed into motive housing 6.

Referring now to Fig. 5 of the drawings, which shows on an enlarged scale one of the centrifugally operated automatic hydraulic release valves 12$^a$ or 12$^b$, 12$^g$ is a piston type valve closure having a hydraulic packing 12$^h$ secured by screw 12$^i$ and washer 12$^j$. Integral with said valve closure 12$^g$ is a centrifugal weight 12$^k$ restrained by a compression spring 12$^l$ within a chamber 12$^m$ and a separate gland ring 12$^n$, which chamber and ring can, alternatively, be combined to form one member to facilitate assembly of the valve as a unit. 12$^o$ denotes a hydraulic packing ring adapted to seal the hydraulic fluid medium within the aperture of clutch housing 6 wherein said valve, as shown in Fig. 1, is radially disposed. 12$^p$ is an adjusting cap for the compression spring 12$^l$, and 12$^q$ denotes auxiliary weights for the centrifugal weight 12$^k$, as may be required to enhance the centrifugal force on the valve.

In operation, said piston valve 12$^g$ will be in the position illustrated in Fig. 5 whilst it is rotating at a lower speed than that at which it is set to operate. When the operating speed is reached, weight 12$^k$ moves outward under centrifugal force and against the restraining influence of the compression spring 12$^l$, until the piston type valve closure 12$^g$ and hydraulic packing 12$^h$ have moved beyond the passage (12$^c$, Fig. 1) to the ram chamber (8$^a$, Fig. 1), so that said passage ceases to be in communication with the passage (12$^e$, Fig. 1), leading to the reservoir (9$^a$, Fig. 1), thus permitting pressure to be built up in said ram chamber. This hydraulic pressure augments centrifugal force to keep the valve closed pending a predetermined speed of rotation lower than that at which the valve operated to close the hydraulic circuit. When this lower predetermined speed of rotation is reached, the valve is moved radially inward by means of spring 12$^l$, and the hydraulic pressure is released from the ram chamber.

Figure 6:
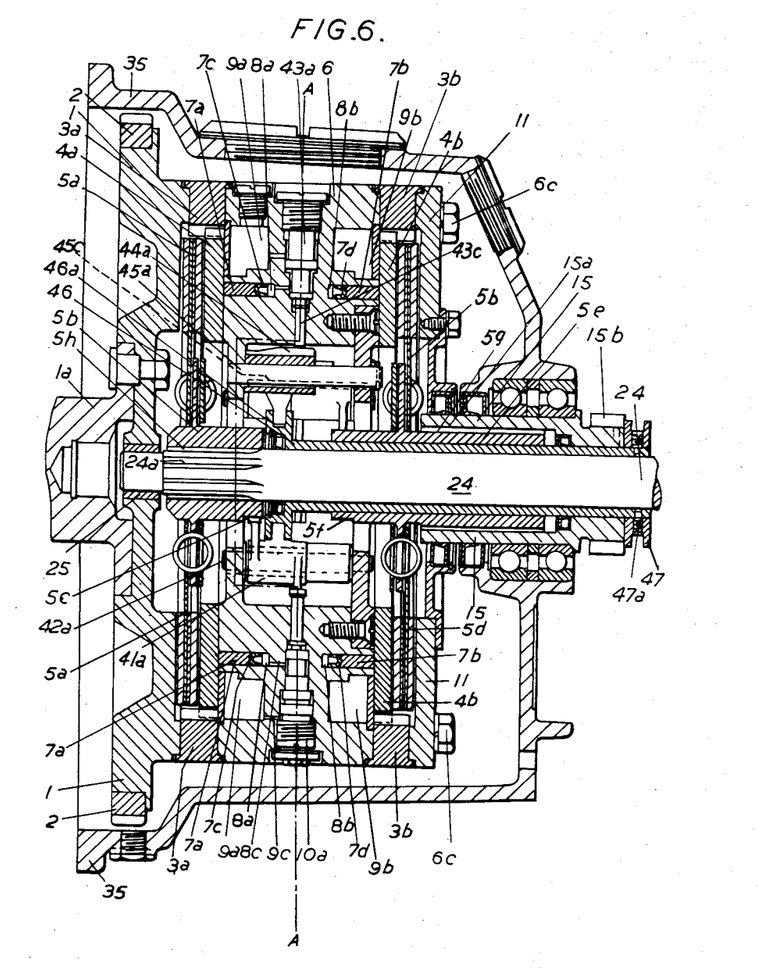
Fig. 6 is a sectional elevation of an alternative assembly to that in Fig. 1 of the hydraulically operated friction clutches.
Figure 7:
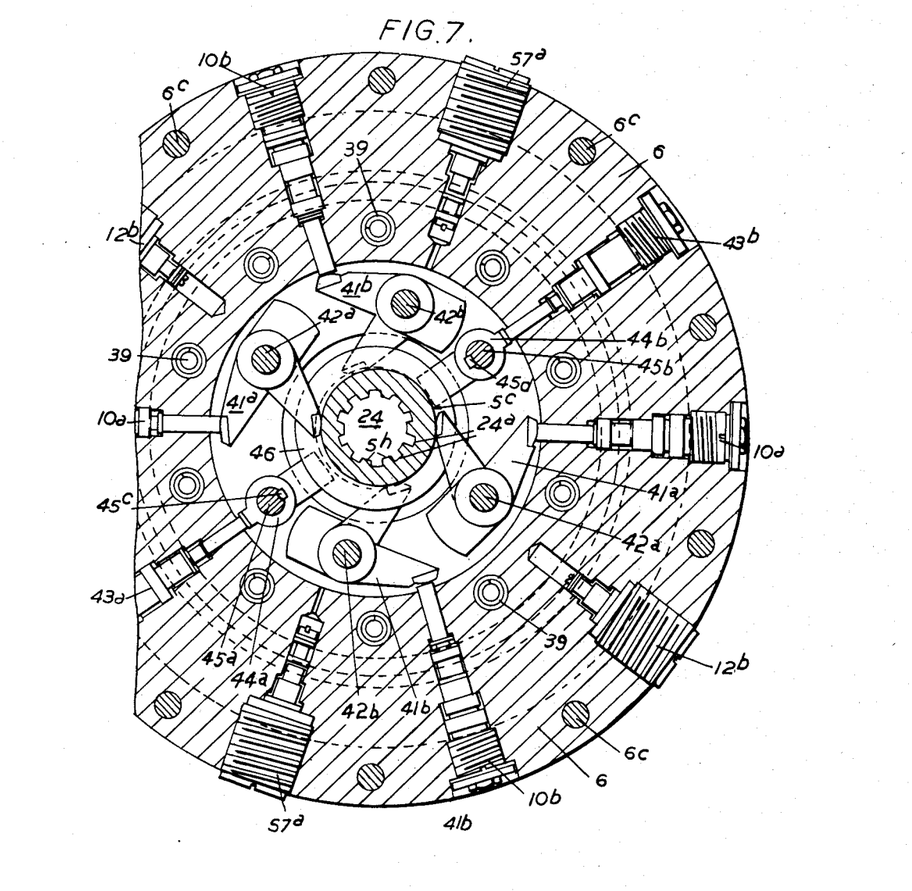
Fig. 7 is a sectional end elevation of the hydraulically operated clutch assembly shown in Fig. 6, and taken as on line A—A.

Referring to Figs. 6 and 7 of the drawings, 1 denotes the engine flywheel of a vehicle, 1$^a$ the engine shaft, 2 the self-starter engageable toothed rim, and 3$^a$, 3$^b$ foremost and rear housings which have internal splines in engagement with corresponding splines formed externally on foremost and rear pressure plates 4$^a$ and 4$^b$, respectively. 5$^a$ and 5$^d$ are, respectively, foremost and rear friction clutch plates of known spring drive construction, and constituting the driven members. 5$^b$ denotes the foremost clutch plate hub provided with internal driving splines 5$^h$; and 5$^c$ is a cam or eccentric integral with the hub 5$^b$ for actuating the foremost hydraulic pumps. 5$^e$ is the rear clutch plate hub having external driving splines 5$^g$, and 5$^f$ is a cam or eccentric integral with hub 5$^e$ for actuating the rear hydraulic pumps.

6 is the motive housing for the hydraulic mechanism, and 7$^a$, 7$^b$, respectively, denote foremost and rear hydraulic rams (of annular form in this example), 7$^c$, 7$^d$ being hydraulic packings for rams 7$^a$, 7$^b$, respectively. 8$^a$, 8$^b$ are the foremost and rear annular ram chambers respectively, and 8$^c$, together with another passage (not shown) are the connecting passages between the respective chambers and the pump deliveries. 9$^a$, 9$^b$ are, respectively, foremost and rear annular reservoirs for the hydraulic fluid medium, and 9$^c$, together with another passage (not shown) are the connecting passages between said reservoirs and the interior of hydraulic pump units 10$^a$, 10$^b$ for foremost and rear clutches, respectively. 11 is a reaction plate for the rear clutch, and 57$^a$ and 12$^b$ (Fig. 7) are centrifugally operated automatic hydraulic pressure release valves for foremost and rear clutches. Passages connect foremost ram chamber 8$^a$ and reservoir 9$^a$, respectively, to valve 57$^a$, and passages connect the rear ram chamber 8$^b$ and reservoir 9$^b$ to valve 12$^b$, for instance, see passages 12$^c$, 12$^e$, Fig. 1. In this example, the hydraulic pumps 10$^a$, 10$^b$ are operated indirectly from cams 5$^c$, 5$^f$, respectively, by means of oscillatable foremost and rear tappets or rockers 41$^a$, 41$^b$ disposed on fulcrum pins 42$^a$, 42$^b$, respectively. Manually releasable valves as at 43$^a$, for the foremost and rear clutches, respectively, are disposed radially, in this example, and are displaceable by cams as 44$^a$, slidably disposed on guide pins as 45$^a$, said cams being prevented from rotation by keys as 45$^c$. The sliding sleeve 46 has integral guide collars 46$^a$. At the end of sleeve 46 remote from flywheel 1 a collar 47 is secured by means of grub screws 47$^a$, said collar being arranged to be operated by a spur similar to spur 14$^c$ described with reference to Fig. 2.

The rearward portion or gear box (not shown) for the embodiment illustrated in Figs. 6 and 7 is substantially the same as that herein described with reference to Fig. 2.

The method of operating the embodiment of Figs. 6 and 7 is similar to that described for the embodiment of Figs 1, 2 and 3, except for the operation of the pressure release valves which is now to be described.

The cams as at 44$^a$ for operating said release valves are slidable parallel to the axis of shaft 24 by, and in unison with, sleeve 46, but the actuating portion of the cam 44$^a$ is extended beyond that of the other cam 44$^b$ so that when said cams are in the foremost position, both valves are open. When the cams are in a midway position, cam 44$^a$ continues to operate pressure release valve 43$^a$, but the other ceases to operate its respective valve and the foremost clutch alone is rendered operative and ready for actuation. On the cams being moved fully to the rear by means of sleeve 46, cam 44$^a$ also ceases to operate its release valve 43ª, and the rear clutch is likewise rendered operative and ready for engagement as and when conditions for clutching prevail.

Figures 8, 9:
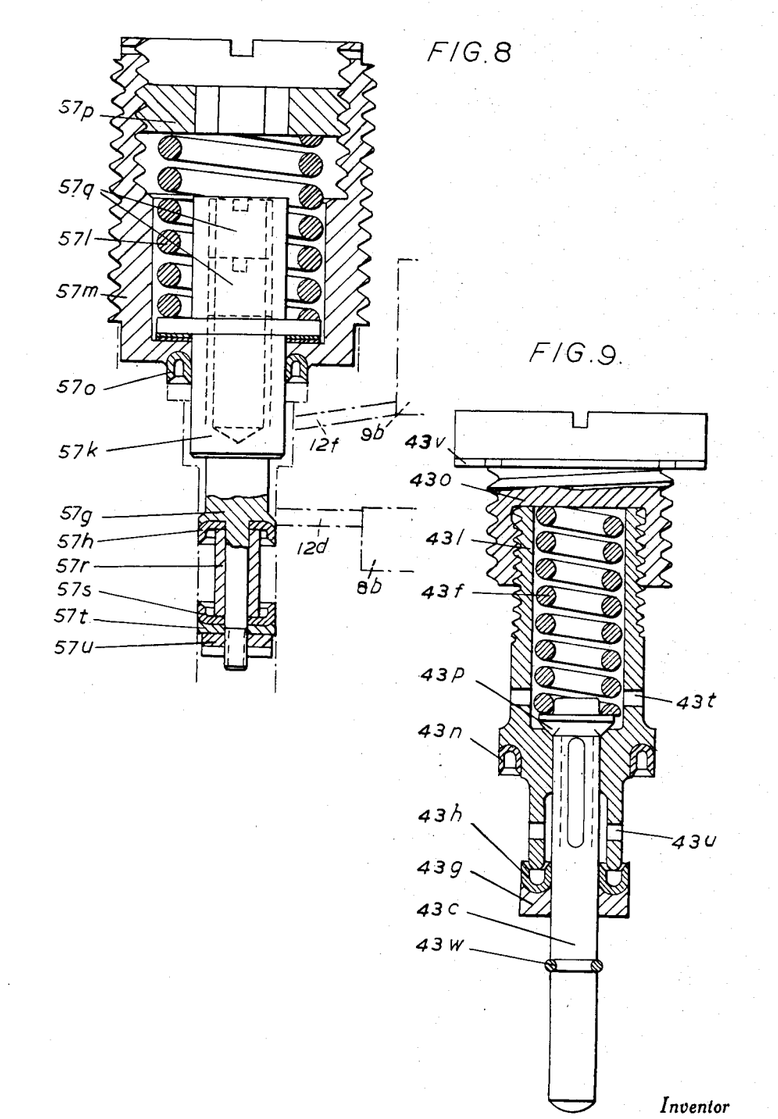
Fig. 8 is a part sectional elevation of a modification of the automatic release valve shown in Fig. 5.
Fig. 9 is a sectional elevation of a release valve for operation either automatically or manually.

Referring now to Fig. 8 which shows details of the before referred to centrifugally operated automatic release valve 57ª of Figs. 6 and 7 and which is adapted to cause its associated clutch to engage and disengage at the same speed of rotation, 57$^g$ denotes a piston type valve closure having a hydraulic packing ring 57$^h$, and which closure 57$^g$, is balanced by a piston 57$^t$ provided with hydraulic packing 57$^s$. Said piston 57$^t$ is secured on a reduced portion of the shaft of said valve closure 57$^g$ by a nut 57$^u$, and hydraulic packings 57$^h$, 57$^s$ for said closure 57$^g$ and piston 57$^t$, respectively, are spaced apart by a sleeve 57$^r$. Formed integrally with closure 57$^g$ is a weight 57$^k$, which is restrained by a helical compression spring 57$^l$ within a housing 57$^m$ the construction of which latter facilitates the assembly of the automatic release valve, and its insertion in a clutch housing as a unit. 57$^o$ is a hydraulic packing ring which seals the hydraulic fluid medium within the aperture in the clutch housing in which the valve operates, and 57$^p$ is an adjustment cap for the compression spring 57$^l$. 57$^q$ denotes auxiliary weights which may be added to the weight 57$^k$, as may be required to control the timing of the valve's operation.

In operation, whilst the clutch housing is rotating at lower speeds than that at which the valve 57ª is set to operate, said valve will be in the position as illustrated in Fig. 8, but when the operating speed is attained, the weight 57$^e$ moves radially outward under centrifugal force against the influence of the compression spring 57$^l$ until the valve closure 57$^g$ and hydraulic packing 57$^h$ have moved beyond the passage 12$^d$ communicating with the ram chamber 8$^b$, so that it ceases to be in communication with the passage 12$^f$ from the reservoir 9$^b$ thus permitting pressure to be built up in said ram chamber. When the valve closure 57$^g$ is in an outer, sealing, position, the opening of passage 12$^d$ is confined between said valve closure 57$^g$ and the balance piston 57$^t$ and pressure within the compartment so formed between valve closure 57$^g$ and piston 57$^t$ cannot exert a force to keep the valve closed, and said valve may open or close at the same speed of rotation, as opposed to the action of the valve of Fig. 5 which is designed to close at a lower speed of rotation than that at which it opens.

Figure 10:
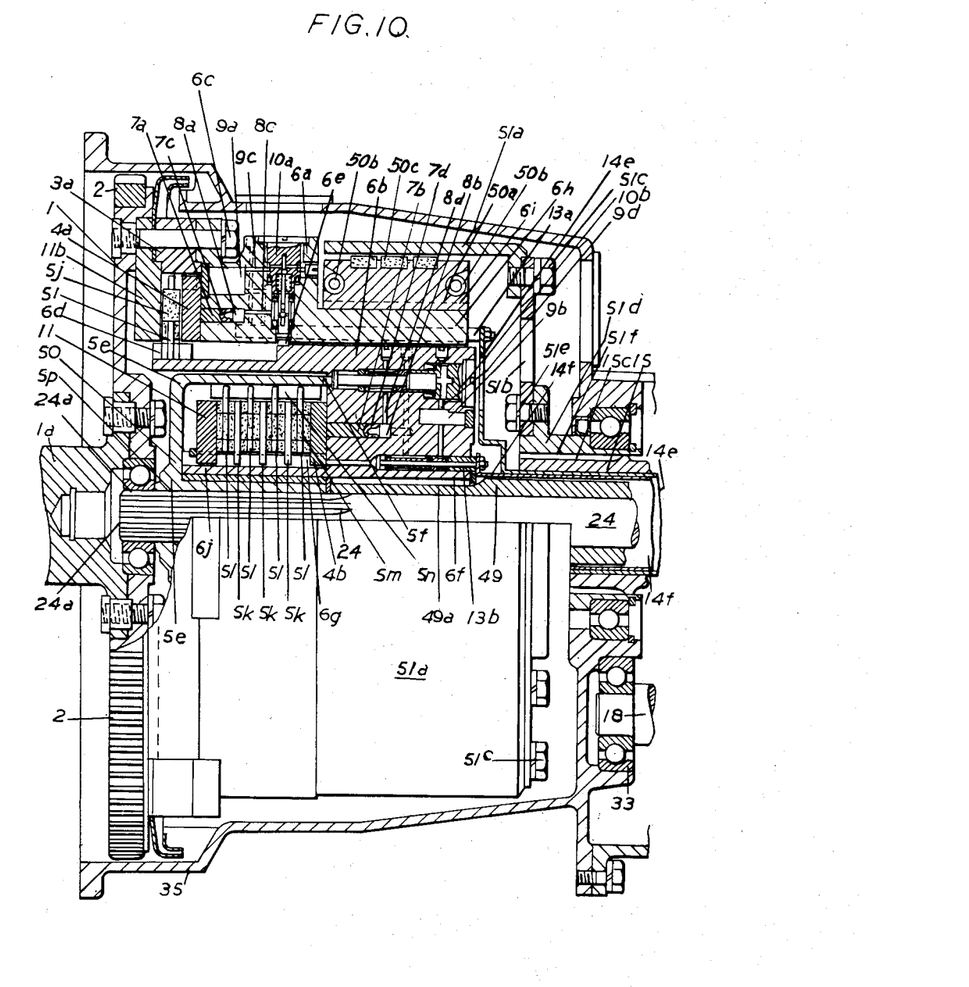
Fig. 10 is a sectional elevation of an assembly of two hydraulically operated friction clutches in conjunction with a third clutch of known type.

Referring now to Fig. 10 of the drawings, 1 denotes the engine flywheel of a vehicle, and 3ª is a housing provided with internal splines for engaging corresponding splines on a foremost pressure plate 4ª. 5$^t$ is the foremost friction clutch plate of known construction with internal driving splines for engaging corresponding driven splines 6$^d$ formed integral with the rear clutch motive housing 6$^b$, said clutch plate 5$^t$ having, in this example, inserted cork friction surfaces 5$^j$. 6ª is a motive housing for the foremost clutch hydraulic mechanism, 7ª is a hydraulic ram, in this example, of annular form, and 7$^c$ the hydraulic packing for said ram. 8ª is the ram chamber, 8$^c$ is the connecting passage between said ram chamber 8ª and the pump delivery, 9ª is the foremost annular reservoir for the hydraulic fluid and 9$^c$ is the connecting passage between reservoir 9ª and the pump 10ª which is the hydraulic pump unit for the foremost clutch, and 11$^b$ is a reaction plate for the latter. The driving portions of said foremost clutch, consisting of flywheel 1, reaction plate 11$^b$, pressure plate housing 3ª, and clutch motive housing 6ª, are secured together, to form a composite unit, by coupling bolts 6$^c$ disposed around the periphery of the unit. 6$^b$ denotes a motive housing for the rear clutch hydraulic mechanism, which housing 6$^b$ is disposed radially inward of the foremost hydraulic clutch, for convenience, and the hydraulic pumps 10$^b$ are in this instance located therein parallel to the axis of rotation. The periphery of the clutch housing 6$^b$ is extended forwardly and is provided integrally at its foremost end with splines 6$^d$ which engage with the internal splines of clutch plate 5$^l$. Formed in the periphery of clutch motive housing 6$^b$ is a cam or eccentric 6$^e$ which actuates hydraulic pump 10ª of the foremost hydraulic clutch when there is relative motion between the respective clutch motive housings. Disposed within the rear clutch housing 6$^b$ is a hydraulic ram 7$^b$ of annular form, and 7$^d$ is the hydraulic packing for said ram. 8$^b$ is the annular ram chamber, 8$^d$ a connecting passage between said ram chamber 8$^b$ and the pump delivery, 9$^b$ is the rear annular reservoir for the hydraulic fluid, and 9$^d$ is the connecting passage between the reservoir 9$^b$ and the pump suction. 10$^b$ is the hydraulic pump unit for the rear hydraulic clutch. Said rear clutch motive housing 6$^b$ is provided with internal driving splines 6$^f$ which engage with external driven splines 49ª formed integrally with an intermediate torque sleeve 49. 4$^b$ is the rear pressure plate whereby the pressure from ram 7$^b$ presses clutch plates 5$^k$, 5$^l$, of a multi-plate clutch into frictional engagement with reaction plate 11. 5$^k$, 5$^l$ are, respectively, driving and driven clutch plates, plate 5$^k$ being provided with internal splines engaging with external splines 6$^g$ formed on an inner tubular extension 6$^j$ of clutch motive housing 6$^b$. The driven clutch plates 5$^l$ have, in this example, inserted cork friction surfaces 5$^m$ and external splines for engaging with driven splines 5$^n$ formed integrally with rear clutch plate hub 5$^e$ which latter, in turn, is provided with internal splines 6$^p$ for engaging with splines 24ª at the foremost end of main driving shaft 24. Hub 5$^e$ is also provided with an integral cam 5$^f$ for actuating pumps 10$^b$. 13ª, 13$^b$ are, respectively, manually operable release valves of piston type for the clutches, and, in this instance, valves 13ª are operable independently of the valves 13$^b$ by operating members 14$^e$ and 14$^f$, respectively, and said members 14$^e$, 14$^f$ are axially slidable relative to each other and revoluble in relation to each other, and to adjacent parts.

The manual operation of said valves 13ª, 13$^b$ is accomplished in a similar manner to that of the valves 14$^c$ and 14$^d$ as hereinbefore described with reference to Fig. 1, except, that in this embodiment two independent mechanisms are provided and centrifugally operated automatic hydraulic release valves, not shown, similar to those hereinbefore described are incorporated. In this clutch assembly, three clutches are shown, two of which are of automatic hydraulic type, as hereinbefore described, while the third clutch, generally designated 50, is a centrifugal weight-operated friction clutch of known construction and characteristics. This assembly is an example of a combination of automatic hydraulic clutches, according to the present invention, and other known clutches. Said centrifugal weight-operated friction clutch is disposed on an extension 6$^h$ of clutch housing 6ª towards the rear, and is provided with a key 6$^i$ for each segmental weight 50ª, which weights engage with and are driven by keys 6$^i$. Circumferential helical springs 50$^b$ are adapted to return weights 50ª to their inoperative positions when speed is reduced, and cork inserts 50$^c$ form friction surfaces for frictional engagement with a driven rim 51ª, which latter is secured to disc 51$^b$ by bolts 51$^c$. Disc 51$^b$ is coupled to hub 51$^d$ by bolts 51$^e$, and the drive is communicated by means of internal splines 51$^f$ to a first gear torque sleeve 15 by external splines 15$^c$ of sleeve 15.

In the application of a combination of clutches, as described, to a gear unit similar to that described with reference to Fig. 2, further ratios of gearing may be added and changes of gear ratio with less manual changing being necessary are possible, depending of course, upon the construction of the gear unit to which the clutch assembly is applied. In the example illustrated in Fig. 2, two torque transmission members, sleeve 15, and shaft 24, are provided with respective clutches for alternative ratios of gearing, and these members are augmented by friction synchronising dog clutches 23ª, 23$^b$ to give four ratios of gearing, but in the example, as illustrated in Fig. 10, three torque members are provided, namely, sleeve 15, sleeve 49, and shaft 24. The assembly illustrated in Fig. 10, therefore, when augmented by a friction synchronising dog-clutch permits the application of my invention to gear units having five gear ratios, or four gear ratios if said synchronising dog clutch is replaced by an overrunning roller clutch.

The operation of the apparatus of Fig. 10 is as follows:

The first gear ratio is obtained by the automatic engagement of the centrifugal, weight-operated, friction clutch 50, the second gear ratio is obtained by automatic engagement of the foremost hydraulic friction clutch, and the third gear ratio is obtained by rendering inoperative the foremost hydraulic clutch by the release of hydraulic pressure on the clutch, either by the centrifugally operated release valves, or by the manual release valves, according to the requirements of the gear unit and the automatic engagement of the rear hydraulic friction clutch. The fourth gear ratio is obtained by closing the appropriate release valves of the foremost clutch and thus again rendering same operative. The centrifugally operated valves become operative only at a predetermined speed. The two hydraulic friction clutches, both now being locked, communicate motion direct to the transmission shaft of the vehicle. Where a fifth gear ratio is required, a manually operated friction synchronising dog clutch, or the like, may be introduced between the other gear ratios, preferably where its use is infrequent, or interconnected with reverse gears to facilitate alternative reversal of the vehicle, which is essentially a manual operation.

Figure 11:
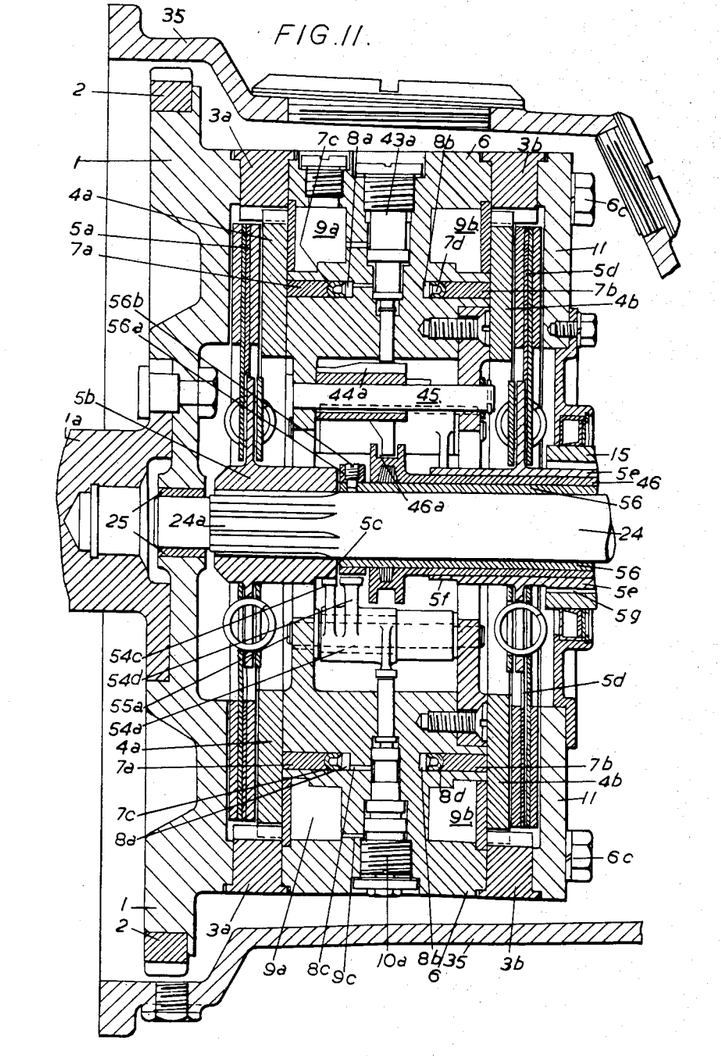
Fig. 11 is a sectional elevation of an assembly, as shown in Fig. 6 of two hydraulically operated friction clutches, but having additional means for augmenting the hydraulic pressure.

Referring to Fig. 11 which illustrates a clutch similar to that of Fig. 6 but provided with means for independent actuation of a hydraulic pump for augmenting the pressure in the hydraulic system of the clutch, $5^b$ denotes the hub of a foremost clutch plate having a cam $5^c$ formed integral therewith. $7^a$, $7^c$ are, respectively, the foremost hydraulic ram and hydraulic packing therefor; $8^a$ is the foremost annular ram chamber, and $8^c$ is the connecting passage between the ram chamber and the pump delivery. $9^a$ is the foremost annular reservoir for the hydraulic fluid medium, $9^c$ is the connecting passage between the reservoir and pump suction, and $10^a$ is the foremost hydraulic pump unit which, in addition to being indirectly operable by cam $5^c$ by means of an oscillating tappet member or rocker $54^a$ with its arm $54^c$, is also operable independently by means of an arm $54^d$ actuable by a cam $56^a$ secured by a grub screw $56^b$ to a sleeve 56 revolubly disposed on shaft 24. In operation, should the pressure in the ram chamber $8^a$ drop, although the pumps have ceased to be actuated by cam $5^c$ through engagement of the foremost clutch, it may be necessary to augment the hydraulic pressure to avoid subsequent slipping of the clutch. Sleeve 56 may be operable, for example, by separate gearing driven from a counter-shaft in the associated gear box so as to impart to said sleeve a motion relative to that of shaft 24, or a brake may be provided to retard the motion of sleeve 56 in relation to shaft 24. In the operation of said independent pumping means, excessive pressure in the ram chamber $8^a$ is relieved by a release valve which may be similar in construction to the valves $43^a$ hereinbefore referred to in relation to Figs. 6 and 7 and hereinafter described in detail in Fig. 9, and which release valve is operable automatically at a predetermined pressure, or manually as may be expedient.

Referring to Fig. 9 $43^e$ denotes the stem of the valve of Fig. 11, having formed integrally therewith a valve closure $43^p$. $43^f$ is a restraining compression spring for said valve $43^p$; $43^h$ is a hydraulic packing ring for the valve stem $43^e$; and $43^n$ is a hydraulic packing ring adapted to seal the hydraulic pressure of the ram chamber ($8^a$ or $8^b$) from the hydraulic fluid reservoir ($9^a$ or $9^b$). $43^l$ is a housing for the compression spring $43^f$, which housing also forms a seating for the valve closure $43^p$. $43^o$ is a plug for closing the valve aperture in the clutch motive housing 6, and $43^v$ is a gasket for sealing said plug $43^o$, $43^t$ and $43^u$ are, respectively, passages formed in said housing for the hydraulic fluid and in communication with the reservoir ($9^a$ or $9^b$) and ram chamber ($8^a$ or $8^b$) as hereinbefore described. $43^w$ is a ring limiting the movement of valve stem $43^e$.

In operation, the valve is adapted to relieve the hydraulic pressure in the ram chamber ($8^a$ or $8^b$) of a hydraulically-operated friction clutch having independently actuated hydraulic pumps for augmenting the pressure in the hydraulic system when the limiting safe pressure is reached, and which valve permits the pressure to be relieved without necessity for disengaging the respective clutch. The stem $43^e$ of the valve, which extends radially toward the axis of the clutch, is operable manually as hereinbefore described with reference to Figs. 6 and 7, and stem $43^e$ is actuable by cam $44^a$ or $44^b$ and means associated therewith.

Figure 12:
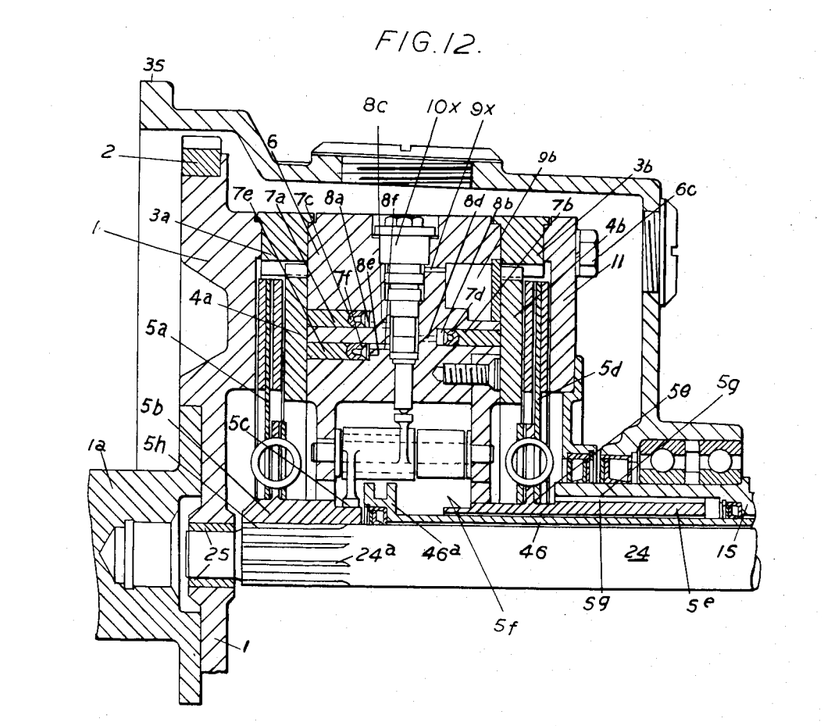
Fig. 12 is a partial view in section of an assembly of two hydraulically operated friction clutches one of which has two separate hydraulic rams for alternate actuation.

Referring now to Fig. 12, 1 denotes the engine flywheel of a vehicle, and $3^a$, $3^b$ housings with internal splines for engaging corresponding splines on foremost and rear pressure plates $4^a$, $4^b$, respectively. $5^a$, $5^d$ are, respectively, foremost and rear friction clutch plates of known spring drive construction and constituting driven members; $5^b$ is a foremost clutch plate hub provided with internal driving splines $5^h$; and $5^c$ is a cam or eccentric formed integral with hub $5^b$ for actuating the foremost hydraulic pumps. $5^e$ is the rear clutch plate hub provided with external driving splines $5^g$ and $5^f$ is a cam or eccentric formed integral with the hub for actuating the rear hydraulic pumps. 6 is the motive housing for the clutch operating hydraulic mechanism, while $7^a$, $7^e$ are independently operated hydraulic rams of annular form, both of which are for the foremost clutch and $7^b$ is the rear hydraulic ram, also of annular form. $7^c$, $7^d$, $7^f$ denote hydraulic packings for the rams $7^a$, $7^b$, $7^e$, respectively. $8^a$, $8^e$ are the respective ram chambers for foremost rams $7^a$, $7^e$; and $8^b$ is the ram chamber for ram $7^b$. Three independently operable hydraulic pumps are provided, two (not shown) as $10^a$, $10^b$, Fig. 1, and $10^x$ for ram $7^e$, and the pumps for the foremost clutch have their deliveries connected to the foremost ram chambers $8^a$, $8^e$ by passages $8^c$ (indicated by broken line), and $8^f$ and the delivery of the pump for the rearmost clutch is connected to the rear ram chamber $8^b$ by a passage $8^d$ (indicated by broken line).

$9^b$ is an annular reservoir for the hydraulic fluid and is common to all pumps, $9^x$ being the connecting passage between the reservoir and the suction of pump $10^x$. The other pumps are connected by similar passages to reservoir $9^b$. 11 is a reaction plate for the rear clutch. In this example, both pumps for the foremost clutch are operated indirectly from cam $5^c$, and the pumps of the rear clutch are operated indirectly from cam $5^f$ by the means as hereinbefore described with reference to Figs. 6 and 7.

This assembly may be applied to gear units, including those of epicyclic or planetary type, to provide alternative speed ratios. In operation, the foremost clutch is first engaged by hydraulic ram $7^a$, and clutch plate $5^a$, in turn, rotates shaft 24 which, for example, could be adapted to drive one member of an epicyclic gear unit giving a first gear ratio. The rear clutch is next engaged by hydraulic ram $7^b$, when clutch plate $5^d$ rotates sleeve $5^e$ and drives a second member of the epicyclic gear unit, giving a second ratio of gearing, the pressure in ram chamber $8^a$ being released by means of a valve (not shown) adapted for automatic operation by a pressure connection from ram chamber $8^b$ and similar in construction to the valve described in detail with reference to Fig. 9. The foremost clutch is again engaged, but this time by ram $7^e$, due to pressure building up in ram chamber $8^e$. In this instance both clutches are engaged simultaneously to give a third gear ratio.

Figure 13:
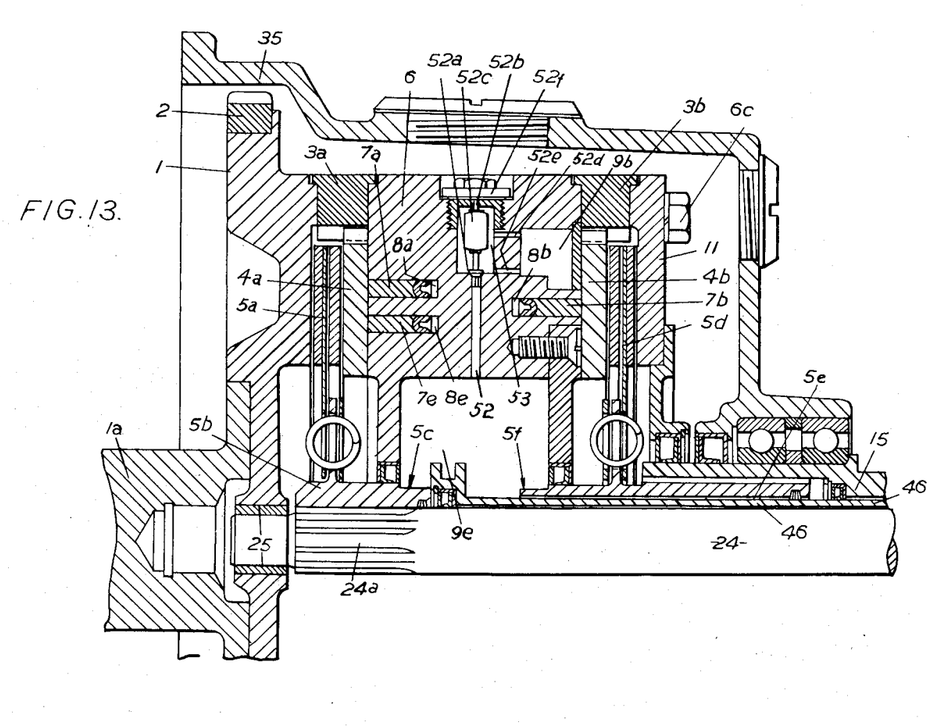
Fig. 13 is a sectional elevation of an assembly, as shown in Fig. 10 of two hydraulically operated friction clutches, with added means for augmenting the hydraulic fluid in the reservoir.

Referring to Fig. 13, 6 denotes the motive housing for the hydraulic mechanism of a friction clutch assembly substantially as illustrated in Fig. 10, provided with means for augmenting the hydraulic fluid supply in reservoir 9$^b$, while 9$^e$ is a supplementary hydraulic fluid reservoir and 52 is a radial passage communicating with chamber 53 housing automatically operated means for regulating replenishment of the hydraulic fluid. 52$^a$ is a valve for closing passage 52, said valve being formed integral with a spindle 52$^b$ whereto a float 52$^c$ is attached. 52$^d$, 52$^e$ are, respectively, fluid and vent passages connecting reservoir 9$^b$ and chamber 53, and 52$^f$ is a cap for guiding spindle 52$^b$ and for sealing chamber 53.

In operation, when the hydraulic fluid supply in reservoir 9$^b$ is adequate for the pump suctions, the fluid flows radially outward from the axis of rotation, due to the velocity of the clutch motive housing 6, and displaces the float 52$^c$ radially inward, thereby closing valve 52$^a$. Should the supply of fluid in reservoir 9$^b$ become inadequate the float will be permitted to move by centrifugal force outward, as the fluid will be insufficient to support same, and valve 52$^a$ will open and allow the fluid from reservoir 9$^e$ to flow along passage 52 under centrifugal force until reservoir 9$^b$ is replenished.

While the various embodiments of my invention are described herein as utilising hydraulic mechanism incorporated within the driving portion of a clutch, it is, of course, to be understood that in some cases the arrangement may be reversed and said hydraulic mechanism incorporated within the driven portion of a clutch.

What I claim as my invention and desire to secure by Letters Patent is:

1. A hydraulic clutch arrangement comprising a clutching member, a first member to be clutched, a second member to be clutched, a first hydraulic plunger pump radially mounted in the clutching member for operating the clutching member into engagement with the first member to be clutched, a second hydraulic plunger pump radially mounted in the clutching member for operating the clutching member into engagement with the second member to be clutched, a radially reciprocable plunger for operating the first hydraulic plunger pump, an eccentric cam for driving said plunger and mounted to rotate with the first member to be clutched, a second radially reciprocable plunger for operating the second hydraulic plunger pump, a rocker pivotally mounted in the clutching member and having a rocker arm bearing on the first eccentric cam and a second rocker arm engaging the first plunger, and a second rocker pivotally mounted in the clutching member and having a rocker arm bearing on the second eccentric cam and a second rocker arm engaging the second plunger.

2. A hydraulic clutch arrangement comprising a clutching member, a first member to be clutched, a second member to be clutched, a first hydraulic plunger pump for operating the clutching member into engagement with the first member to be clutched and mounted to rotate with the clutching member, a second hydraulic pump for operating the clutching member into engagement with the first member to be clutched and mounted to rotate with the clutching member, a third hydraulic pump for operating the clutching member into engagement with the second member to be clutched and mounted to rotate with the clutching member, operating members for the hydraulic pumps, a centrifugally operable valve mounted to rotate with the clutching member for determining the speed of rotation thereof at which the clutching member will be operated into engagement with the first member to be clutched by means of the first hydraulic pump, a second centrifugally operable valve mounted to rotate with the clutching member for determining the speed of rotation thereof at which the clutching member will be operated into engagement with the second member to be clutched by means of the third hydraulic pump, a valve mounted in the clutching member for effecting release of the clutching member and first member to be clutched under the control of the fluid pressure causing the engagement of the clutching member and the second member to be clutched, and a third centrifugally operable valve mounted to rotate with the clutching member for determining the speed of rotation thereof at which the clutching member will again be operated into engagement with the first member to be clutched by means of the second hydraulic pump.

3. A hydraulic clutch arrangement comprising an annular clutch motive housing having a pair of annular reservoirs and a pair of annular ram chambers each located radially inward in relation to its associated reservoir, a pair of hydraulic plunger pump units mounted in apertures in the housing so as to be readily withdrawable therefrom and each with its delivery connected by a passage in the housing to the respective ram chamber associated therewith, and its supply connected by a passage in the housing to the respective reservoir associated therewith, a pair of clutch plates each having a hub mounted within the annular housing, eccentric means associated with each hub for actuating the respective plunger pump unit associated therewith, a ram mounted within each ram chamber, a pair of pressure plates each adapted to be operated by its associated ram to engage the associated clutch plate with the housing, a pair of centrifugally operable valve means each located in a radial aperture in the housing so as to be readily withdrawable therefrom, one controlling the opening and closing of a passage in the housing connecting the respective reservoir and ram chambers associated therewith at a particular speed of revolution of the housing, and the other controlling the opening and closing of a passage in the housing connecting the other reservoir and associated ram chamber at another speed of revolution of the housing, a pair of overriding manually operable valve means each for controlling the opening and closing of a passage in the housing connecting the respective reservoir and ram chamber associated therewith, and means for restoring each of the pressure plates when the pressure in the respective ram chamber has been released.

4. A hydraulic clutch arrangement as claimed in claim 3, in which the hydraulic plunger pump units are radially mounted in the housing.

5. A hydraulic clutch arrangement as claimed in claim 3, in which the manually operable valve means are slidable in the housing parallel to the direction of the axis of rotation of the clutch.

6. A hydraulic clutch arrangement as claimed in claim 3 in which the manually operable valves are adapted to be reciprocated radially with respect to the rotational axis of the clutching member and are controlled by means of cams slidable in the direction of the rotational axis of the clutching member.

7. A hydraulic clutch arrangement as claimed in claim 3 in which the manually operable valves are adapted to be reciprocated radially with respect to the rotational axis of the clutching member.

8. A hydraulic clutch arrangement as claimed in claim 3 in which the axis of reciprocation of at least one of said plunger pumps is parallel to the axis of rotation of said clutching member.

References Cited in the file of this patent

UNITED STATES PATENTS

| Number | Name | Date |
|---|---|---|
| 574,823 | Richards | Jan. 5, 1897 |
| 635,684 | Herschmann | Oct. 24, 1899 |
| 1,805,081 | Drkal | May 21, 1931 |
| 1,866,891 | Jackson | July 12, 1932 |

(Other references on following page)

UNITED STATES PATENTS

| | | |
|---|---|---|
| 2,153,372 | Hyde | Apr. 4, 1939 |
| 2,178,050 | Peterson | Oct. 31, 1939 |
| 2,221,393 | Carnegie | Nov. 12, 1940 |
| 2,226,801 | Black | Dec. 31, 1940 |
| 2,328,091 | Nutt et al. | Aug. 31, 1943 |
| 2,328,092 | Nutt et al. | Aug. 31, 1943 |
| 2,381,786 | Tyler | Aug. 7, 1945 |
| 2,386,217 | Kegresse | Oct. 9, 1945 |
| 2,452,008 | Wickwire | Oct. 19, 1948 |
| 2,535,924 | Hobbs | Dec. 26, 1950 |